United States Patent [19]

Schmid et al.

[11] Patent Number: 5,360,560

[45] Date of Patent: Nov. 1, 1994

[54] UNIVERSAL LUBRICANT BASED ON A SYNTHETIC OIL SOLUTION

[75] Inventors: Karl Schmid, Mettmann; Frank Bongardt; Juergen Roeder, both of Duesseldorf; Reinhold Wuest, Kaarst, all of Germany

[73] Assignee: Henkel Kommanditgesellschaft auf Aktien, Dusseldorf, Germany

[21] Appl. No.: 135,943

[22] Filed: Oct. 13, 1993

Related U.S. Application Data

[63] Continuation of Ser. No. 836,326, filed as PCT/EP90/01403, Aug. 23, 1990, abandoned.

[30] Foreign Application Priority Data

Sep. 1, 1989 [DE] Germany ............................ 3929071

[51] Int. Cl.$^5$ ............... C10M 169/04; C10M 173/02; C10M 107/34; C10M 129/06
[52] U.S. Cl. .......................................... 252/39; 252/38; 252/41; 252/49.3; 252/49.5; 252/56 R; 252/56 S; 252/52 A; 252/52 R; 252/321; 252/76
[58] Field of Search ................... 252/49.3, 49.5, 52 A, 252/56 R, 56 S, 38, 39, 41, 321, 74, 76, 52 R

[56] References Cited

U.S. PATENT DOCUMENTS

| | | | |
|---|---|---|---|
| 3,313,729 | 4/1967 | Glasson | 252/18 |
| 3,344,075 | 9/1967 | Scott | 252/75 |
| 3,492,232 | 1/1970 | Rosenberg | 252/49.3 |
| 3,492,242 | 1/1970 | Carney | 252/358 |
| 3,645,897 | 2/1972 | Gower | 252/49.3 |
| 3,893,931 | 7/1975 | Sturwold et al. | 252/49.5 |
| 3,925,589 | 12/1975 | Sturwold et al. | 252/49.5 |
| 4,260,499 | 4/1981 | Fein et al. | 252/32.5 |
| 4,391,722 | 7/1983 | Schwartz et al. | 252/49.3 |
| 4,746,450 | 5/1988 | Frentrup et al. | 252/49.3 |
| 4,800,034 | 1/1989 | Akao et al. | 252/49.5 |

FOREIGN PATENT DOCUMENTS 37542 10/1981 European Pat. Off. .

OTHER PUBLICATIONS

Grant and Hackh's Chemical Dictionary, 5th Ed., McGraw-Hill, pp. 22, 230, and 412, (1987).

*Primary Examiner*—Prince Willis, Jr.
*Assistant Examiner*—Alan D. Diamond
*Attorney, Agent, or Firm*—Ernest G. Szoke; Wayne C. Jaeschke; Real J. Grandmaison

[57] ABSTRACT

A water-soluble, foam-inhibiting universal lubricant composition based on an aqueous self-emulsifying synthetic oil solution and an anti-foaming agent. The oil is an ethoxylated dimeric fatty acid, and the anti-foaming agent is made up of a Guerbet alcohol and a metal soap.

16 Claims, No Drawings

UNIVERSAL LUBRICANT BASED ON A SYNTHETIC OIL SOLUTION

This application is a continuation of application Ser. No. 07/836,326 filed as PCT/EP90/01403, Aug. 23, 1990, now abandoned.

BACKGROUND OF THE INVENTION

1. Field of the Invention

This invention relates to a water-soluble, foam-inhibiting universal lubricant based on an aqueous self-emulsifying solution consisting of a mixture of an ethoxylated dimeric fatty acid and a foam inhibitor.

It has been known for some time that, on account of their limited cooling properties, water-insoluble or water-immiscible oils, such as mineral oils or unsaturated fats, are not necessarily lubricants of choice, particularly in the metalworking field. Due above all to the distinct increase in processing speeds and abrasion levels, greater importance is being attributed to the dissipation of heat and, hence, ultimately to the water-miscible or water-soluble universal lubricant. This technological change on the part of the metalworking industry on the one hand and the major change in the approach to works safety and pollution control on the other hand have resulted in a reduction in the mineral oil component through the use of so-called synthetic universal lubricants based on water-soluble constituents free from mineral oils. Taking on-going developments in the surfactants field into consideration, nonionic surfactants in particular have contributed to a major advance in water-miscible or water-soluble lubricants. In this way, water-miscible lubricants, but especially emulsifying or water-soluble lubricants based on a w/o emulsion or a genuine soap solution, have been successfully used to an increasing extent (cf. J. Müller, Tribologie und Schmierungstechnik, Vol. 35, pages 128-132, 1988).

Discussion of Related Art

DE-OS 36 09 039 and DE-OS 36 11 027 describe cold-rolling oils having a low dimeric fatty acid or polymeric fatty acid content of less than 10% by weight, the dimeric fatty acids preferably being derived from monomeric fatty acids containing 16 to 20 carbon atoms of the oleic acid, linoleic acid, gadoleic or zoomaric acid type. However, where these dimeric fatty acids are used in relatively large quantities by weight, unwanted "oil residues" are said to occur "to a remarkable extent".

PCT/WO 88/05809 reports on the use of ethoxylated or propoxylated Guerbet alcohols and esters thereof as lubricants in the processing of, in particular, aluminium cans from the beverage industry. For example, dimeric fatty acid mixtures consisting of dimerized oleic acid, linoleic acid, elaidic acid and tall oil fatty acid components are also used for the esterification.

Now, the problem addressed by the present invention was to provide a totally new concept for a water-soluble universal lubricant which would consist of a mixture of a synthetic oil based on dimeric fatty acid and a certain foam inhibitor.

DESCRIPTION OF THE INVENTION

The combination of an ethoxylated dimeric fatty acid and a foam inhibitor based on Guerbet alcohols has surprisingly led, more particularly through optimization of the degree of ethoxylation of the dimeric fatty acids and through the addition of a suitable foam inhibitor in the form of an aqueous solution, to a universal lubricant having an excellent effect as a cooling lubricant coupled with minimal foaming.

Accordingly, the present invention relates to a water-soluble, foam-inhibiting universal lubricant based on an aqueous self-emulsifying solution of a synthetic oil and a foam inhibitor, characterized in that it contains 90 to 99.9% by weight of at least one ethoxylated dimeric fatty acid as the synthetic oil together with 0.1 to 10% by weight of a foam inhibitor consisting of 90 to 99% by weight of at least one Guerbet alcohol and 1 to 10% by weight of a metal soap.

The crux of the teaching according to the invention lies in the surprising observation that dimeric fatty acids and/or dimeric fatty acid mixtures having a degree of ethoxylation (EO degree) of at least 10 up to and including 30 and preferably of at least 15 to 23 are particularly suitable as foam-inhibiting universal lubricants. Whereas an excessive EO degree leads to increased foaming on account of the increasing hydrophilicity of the lubricant, excessively low EO degrees result primarily in insolubility in water on account of the high level of hydrophobicity, so that unwanted phase separation occurs. The dimerization product of saturated, mono- and/or polyunsaturated $C_{16-22}$ monomeric fatty acids, such as palmitoleic acid, oleic acid, gadoleic acid, erucic acid, ricinoleic acid, linoleic acid, linolenic acid and arachidonic acid, are used at least partly as the ethoxylated dimeric fatty acids and/or dimeric fatty acid mixtures. A preferred embodiment of the invention is characterized by the use of, in particular, oleic acid and linoleic acid mixtures having a degree of ethoxylation of at least 15 to about 23 and preferably of about 18.

To regulate foaming, a foam-inhibiting component is preferably added to the synthetic oil in a quantity of at least 1% by weight to about 5% by weight and, more particularly, in a quantity of about 2% by weight, based on the mixture of synthetic oil and foam inhibitor. According to the invention, the foam inhibitor consists of a stable clear concentrate of a Guerbet alcohol as the carrier material with foam-inhibiting properties and a metal soap dissolved or dispersed therein.

The Guerbet alcohols and/or Guerbet alcohol mixtures commercially obtainable under the tradename "Rilanit" of Henkel KGaA have been successfully used as a carrier material (for the industrial synthesis of Guerbet alcohols, see H. Machemer, Angew. Chemie, Vol. 64 pages 213-220, 1952 and G. Dieckelmann and H. J. Heinz, "The Basics of Industrial Oleochemistry", pages 145-146, 1988). 2-Hexyl decanol, 2-octyl decanol, 2-hexyl dodecanol and/or 2-octyl dodecanol are preferably used.

The metal soaps used are the alkali metal and/or alkaline earth metal salts of saturated, mono- and/or polyolefinically unsaturated fatty acids containing 12 to 24 carbon atoms and, more particularly, 16 to 18 carbon atoms. Saturated fatty acids are preferably used in accordance with the invention, magnesium stearate being particularly preferred. A metal soap content of at least 3% by weight to about 7% by weight and, more particularly, of the order of 5% by weight, based on the Guerbet alcohol/metal soap mixture, is preferred for the purposes of the invention.

The universal lubricants according to the invention may be mixed with a homogeneous aqueous phase of up to 30° dH (dH=German hardness), so that it is even possible to add tapwater from water reservoirs particularly rich in lime. By virtue in particular of their good to very good lubricity and their minimal tendency towards foaming, the clear to opaque-looking aqueous synthetic oil/foam inhibitor solutions with their high long-term stability are suitable as universal lubricants in quantities of at least 0.1% by weight to about 10% by weight and preferably in quantities of at least 1% by weight to about 5% by weight.

Possible applications for the universal lubricants according to the invention are, for example, in land excavation, textile finishing and the machining of plastics and metals where they may be used, in particular, as drilling fluids, transmission oils, hydraulic fluids or, preferably, cooling lubricants and as a lubricating additive or auxiliary in any of the fields mentioned.

EXAMPLES

The invention is illustrated by the following Examples.

Example 1

The following water-based universal lubricant formulations were prepared by mixing the particular individual components used in the quantities shown in Table 1.

TABLE 1

Composition of the universal lubricants

| Constituents | Foam inhibitor | Lubricant | Lubricant formulation | | | |
|---|---|---|---|---|---|---|
| | | | A | B | C | D |
| (a) Empoli 1022[1] (Emery) | | 98% | 5% | 3% | 1% | — |
| (b) Rilanit G 16[2] (Henkel) | 95% | 2% | | | | |
| (c) Mg stearate | 5% | | | | | |
| (d) Water[3] | | | 95% | 97% | 99% | 100% |

Legend:
[1]Dimeric fatty acid ethoxylate consisting of an oleic acid/linoleic acid mixture containing 18 EO groups
[2]2-Hexyl decanol
[3]Dist. water These formulations were tested for their lubricating effect on a Reichert balance (lubricant testing machine according to German utility model 1749247) under a load of 1.5 kg and over a distance of 100 m. After the particular formulation had been tested three times, the abrasion areas shown in Table 2 were obtained.

TABLE 2

Lubricating effect of water-based dimeric fatty acid ethoxylate/foam inhibitor formulations

| Formulation[1] | Abrasion area (mm$^2$) |
|---|---|
| A | 7.2 |
| B | 7.4 |
| C | 10 |
| D | 29.5 |

Legend:
[1]Lubricant formulations A–D from Table 1

Comparison Example 1

To enable a comparison to be made with lubricants known from the prior art, aqueous solutions of an ethoxylated monomeric fatty acid containing 6 EO (no foam inhibitor added) and aqueous solutions of Rewolub KSM 14 (Rewo) were prepared as in Example 1 in the form of 5% (A), 3% (B) and 1% (C) formulations and were tested for their lubricating effect by comparison with distilled water (D) using the Reichert balance (Table 3).

TABLE 3

Lubricating effect of water-based monomeric fatty acid ethoxylate (I) and Rewolub KSM 14 (II) formulations

| Formulation | Abrasion area (mm$^2$) | |
|---|---|---|
| | (I) | (II) |
| A | 21.6 | 9.2 |
| B | 21.9 | 9.6 |
| C | 29.5 | 14.2 |
| D | 29.5 | 29.5 |

Under the justified assumption that the foam inhibitor makes only a small contribution to the lubricating effect, Example 1 and Comparison Example 1 show that, even in small quantities, water-based dimeric fatty acid ethoxylate formulations surprisingly have considerably better lubricating behavior than lubricants known from the prior art.

Example 2

The foaming behavior of the universal lubricants according to the invention was determined by a very simple but efficient method which is described in detail in the following:

50 ml of a 1% aqueous solution of a given lubricant (see Table 4) were transferred to a finely graduated 100 ml measuring cylinder. The cylinder was firmly closed with a stopper and vigorously shaken 36 times. The height of foam formed was determined immediately and after standing for 2 minutes. The difference between the two volume values gave the so-called foam collapse rate (over a period of 2 minutes).

TABLE 4

Foaming behavior of 1% water-based lubricant formulations

| Formulations | Height of foam (ml) | | Foam collapse rate (ml) |
|---|---|---|---|
| | Immediately | After 2 mins. | |
| E[1] (a)[4] | 72 | 59 | 13 |
| (b)[5] | 70 | 60 | 10 |
| F[2] (a) | 75 | 72 | 3 |
| (b) | 75 | 72 | 3 |
| G[3] (a) | 85 | 72 | 13 |
| (b) | 73 | 65 | 8 |

Legend:
[1]98% Empoli 1022 (Emery) containing 18 EO and 2% foam inhibitor based on 95% Rilanit G 18G (Henkel KGaA)[6] and 5% magnesium stearate
[2]Empoli 1022 (Emery) containing 18 EO with no addition of foam inhibitor
[3]Rewolub KSM 14 (Rewo)
[4]Water hardness: 5° dH
[5]Water hardness: 20° dH
[6]Mixture of inter alia 2-hexyl-1-decanol (24%), 2-hexyl-1-dodecanol (41%) and 2-octyl-1-decanol (19%)

By comparison with lubricant G known from the prior art, the preferred universal lubricant E of applicants, particularly with addition of the foam inhibitor, showed a lower initial foam height and an at least equivalent foam collapse rate over a period of 2 minutes.

We claim:

1. A water-soluble, foam-inhibiting universal lubricant composition, said lubricant composition consisting essentially of from 90 to 99.9% by weight of an ethoxylated dimeric fatty acid having a degree of ethoxylation of at least 10 and up to 30 moles of ethylene oxide, and from 0.1 to 10% by weight of a foam inhibitor consisting of from 90 to 99% by weight of a Guerbet alcohol and 1 to 10% by weight of a metal soap dispersed in said Guerbet alcohol.

2. A lubricant composition as in claim 1 wherein said dimeric fatty acid comprises the dimerization product of a saturated, or mono- or poly-olefinically unsaturated $C_{16}$–$C_{22}$ monomeric fatty acid.

3. A lubricant composition as in claim 1 wherein said ethoxylated dimeric fatty acid comprises the dimerization product of oleic acid and linoleic acid having a degree of ethoxylation of at least 15 to about 23 moles of ethylene oxide.

4. A lubricant composition as in claim 1 wherein said Guerbet alcohol is selected from the group consisting of 2-hexyl decanol, 2-octyl decanol, 2-hexyl dodecanol, and 2-octyl dodecanol.

5. A lubricant composition as in claim 1 wherein said metal soap comprises an alkali metal or alkaline earth metal salt of a saturated, or mono- or poly-olefinically unsaturated fatty acid containing from 12 to 24 carbon atoms.

6. A lubricant composition as in claim 5 wherein said metal soap comprises magnesium stearate.

7. A lubricant composition as in claim 1 wherein said foam inhibitor contains at least 3% to about 7% by weight of said metal soap, based on the weight of said foam inhibitor.

8. A lubricant formulation containing water and at least 0.1 to about 10% by weight of the lubricant composition of claim 1.

9. The process of lubricating a surface comprising the contacting said surface with lubricant formulation of claim 8.

10. The process of lubricating a surface, comprising contacting said surface with a water-soluble, foam-inhibiting universal lubricant composition, said lubricant composition consisting essentially of from 90 to 99.9% by weight of an ethoxylated dimeric fatty acid having a degree of ethoxylation of at least 10 and up to 30 moles of ethylene oxide, and from 0.1 to 10% by weight of a foam inhibitor consisting of from 90 to 99% by weight of a Guerbet alcohol and 1 to 10% by weight of a metal soap dispersed in said Guerbet alcohol.

11. The process as in claim 10 wherein said dimeric fatty acid comprises the dimerization product of a saturated, or mono- or poly-olefinically unsaturated $C_{16}$–$C_{22}$ monomeric fatty acid.

12. The process as in claim 10 wherein said ethoxylated dimeric fatty acid comprises the dimerization product of oleic acid and linoleic acid having a degree of ethoxylation of at least 15 to about 23 moles of ethylene oxide.

13. The process as in claim 10 wherein said Guerbet alcohol is selected from the group consisting of 2-hexyl decanol, 2-octyl decanol, 2-hexyl dodecanol, and 2-octyl dodecanol.

14. The process as in claim 10 wherein said metal soap comprises an alkali metal or alkaline earth metal salt of a saturated, or mono- or poly-olefinically unsaturated fatty acid containing from 12 to 24 carbon atoms.

15. The process as in claim 14 wherein said metal soap comprises magnesium stearate.

16. The process as in claim 10 wherein said foam inhibitor contains at least 3% to about 7% by weight of said metal soap, based on the weight of said foam inhibitor.

* * * * *